(12) United States Patent
Chopra et al.

(10) Patent No.: US 8,892,947 B1
(45) Date of Patent: Nov. 18, 2014

(54) METHOD AND SYSTEM FOR AUTOMATION FRAMEWORK FOR MULTI-NODE ENVIRONMENTS

(75) Inventors: Shelesh Chopra, Bangalore (IN); Krishna Reddy, Bangalore (IN); Subramanian Nallasivam, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 269 days.

(21) Appl. No.: 13/418,536

(22) Filed: Mar. 13, 2012

(51) Int. Cl.
*G06F 11/00* (2006.01)

(52) U.S. Cl.
USPC ............................................. 714/32; 717/124

(58) Field of Classification Search
USPC .......................................................... 714/32
See application file for complete search history.

(56) References Cited

U.S. PATENT DOCUMENTS

| | | | | |
|---|---|---|---|---|
| 7,685,472 B1 * | 3/2010 | Shibl et al. | ................. | 714/38.13 |
| 8,166,348 B1 * | 4/2012 | Kulkarni et al. | ............. | 714/38.1 |
| 8,516,309 B1 * | 8/2013 | Kulkarni et al. | ............. | 714/38.1 |
| 8,621,342 B2 * | 12/2013 | Li et al. | .......................... | 715/237 |
| 2010/0070230 A1 * | 3/2010 | Kumar et al. | ................. | 702/119 |
| 2012/0266156 A1 * | 10/2012 | Spivak et al. | ................. | 717/172 |
| 2013/0198346 A1 * | 8/2013 | Jubran et al. | .................. | 709/220 |
| 2013/0198567 A1 * | 8/2013 | Ahmed et al. | .................. | 714/32 |

* cited by examiner

*Primary Examiner* — Kamini Patel
(74) *Attorney, Agent, or Firm* — Dergosits & Noah LLP; Todd A. Noah

(57) ABSTRACT

An automation framework for a multi-node environment is described. A first host computer executes a parser, a first execution engine, a first communication component, and a first logger. A second host computer executes a second execution engine, a second communication component, and a second logger. The parser parses a test case suite to identify multiple script instructions to test an application. The first execution engine executes the first script instruction to locally execute the first script instruction. The first communication component communicates an execution request to the second communication component to remotely execute the first script instruction. The second communication component instructs the second execution engine to execute the first script instruction. The first and the second logger log a first and a second result of executing the first script instruction on the first and the second host computer. The first logger outputs the first result and/or the second result.

20 Claims, 3 Drawing Sheets

US 8,892,947 B1

METHOD AND SYSTEM FOR AUTOMATION FRAMEWORK FOR MULTI-NODE ENVIRONMENTS

BACKGROUND

Test automation is the use of software to control the execution of tests, the comparison of actual outcomes to predicted outcomes, the setting up of test preconditions, and other test control and test reporting functions. An automation framework is not a single tool to perform some specific testing task, but a set of tools that provide support for automated software testing in a unified manner, thereby providing a common platform for an automation engineer to do a job. If there is change to any test case for an application that is being tested, only the test case file needs to be updated, such that the driver script and startup script remain the same. The automation framework integrates the function libraries, test data sources, object details and various reusable modules. The automation framework is responsible for defining the format in which to express expectations, creating a mechanism to drive the application being tested, executing the tests, and reporting the results. Typically an automation framework resides on a host computer and includes a test initializer, a script parser, a script execution engine, and a logger that logs and reports the test results. Since many automation frameworks offer relatively limited test coverage, some real time environments are not adequately simulated, such that some regression tests may be missed, which may cause issues when a tested application is executed in the field.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The subject matter presented herein provides an automation framework that offers expanded test coverage by running on a multi-node environment with multiple host computers, thereby simulating a real time multi-node environment for applications that are executed in a multi-node environment. A system user selects a host computer to function as a test controller, which includes a test initializer to initialize multiple hosts and a script parser to identify script instructions for execution on the multiple hosts. Each of the multiple host computers includes its own script execution engine to execute script instructions, its own form of a logger to log the results of executing the script instructions, and its own communication component that synchronizes application testing between the multiple host computers. Synchronized application testing among multiple host computers enables comparisons of instruction by instruction execution results in each of the host computers, thereby providing the necessary test coverage for applications that execute in a multi-node environment, such as many client-server applications.

Figure 1:
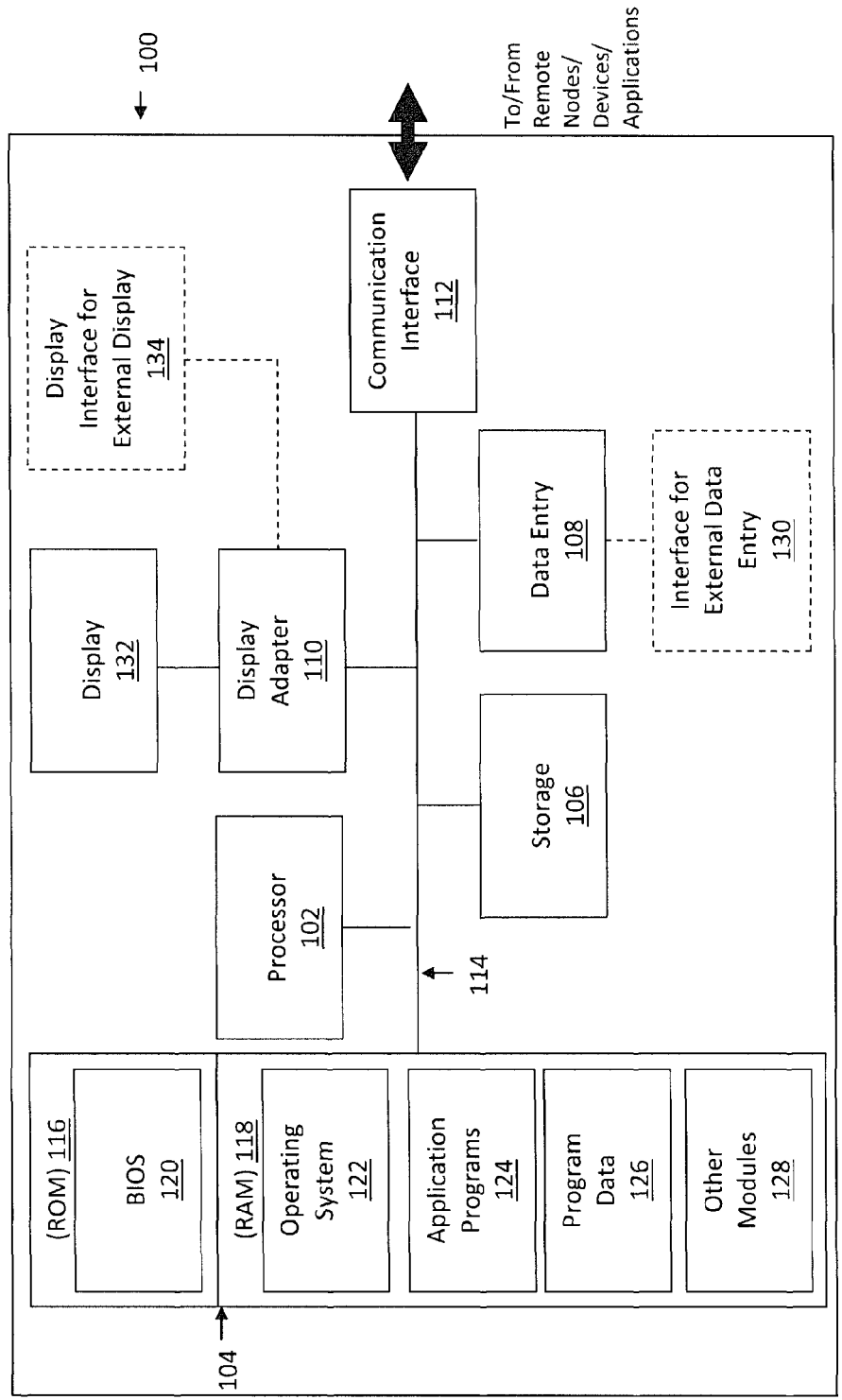
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for an automation framework for a multi-code environment.

Prior art automation frameworks offer limited test coverage for multi-node environments because prior art automation frameworks only test applications on a single node. Therefore, prior art automation frameworks do not adequately simulate a real time environment for a multi-node environment. Subsequently, prior art automation frameworks may miss some regression tests for a multi-node environment, which may cause issues when a tested application for a multi-node environment is executed in the field.

Figure 2:
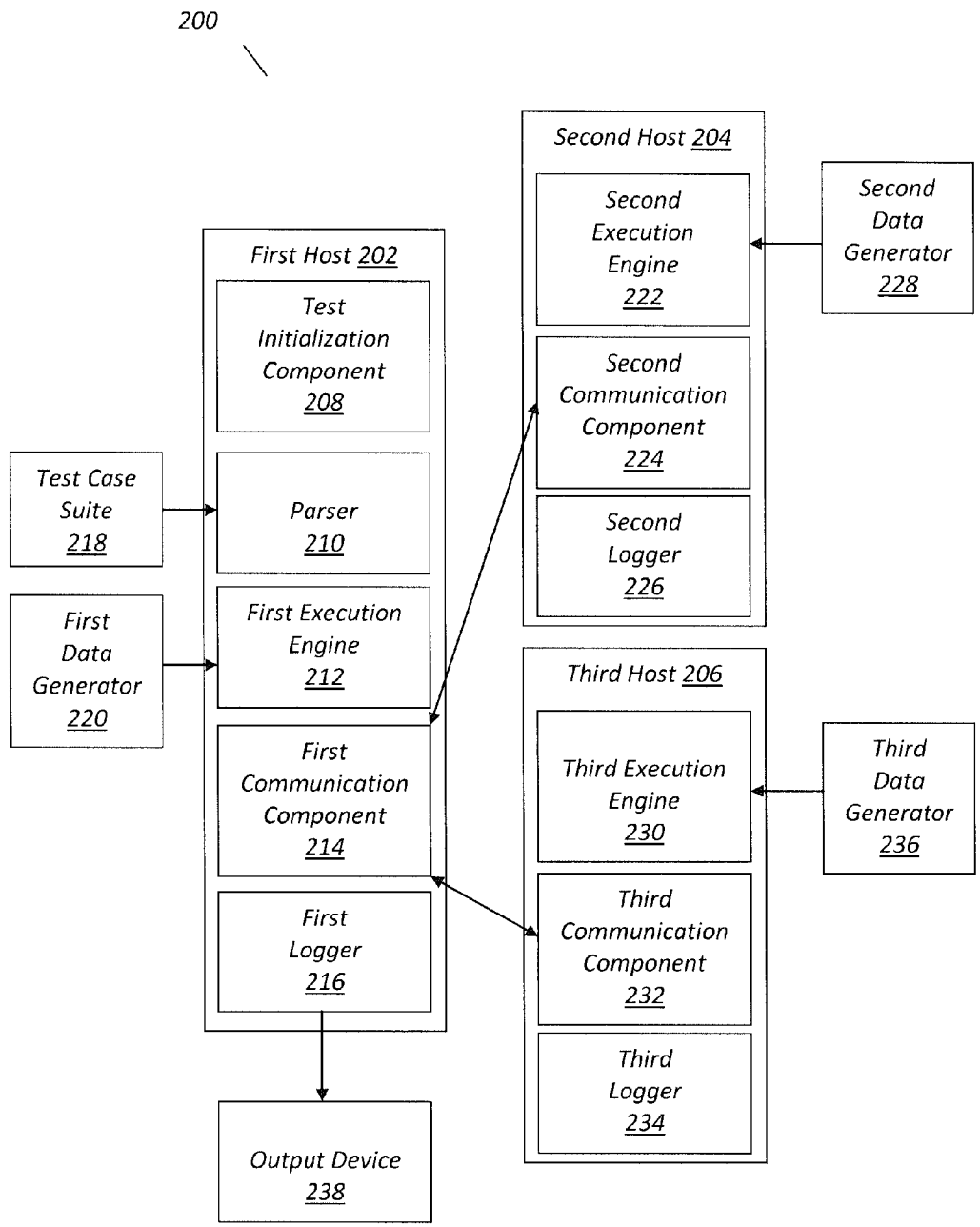
FIG. 2 illustrates a block diagram of an example system for an automation framework testing an application in a multi-node environment, under an embodiment.

Embodiments herein provide an automation framework that offers expanded test coverage by testing applications on a multi-node environment with multiple host computers, simulating a real time multi-node environment for applications that are executed in a multi-node environment. A system user selects a host computer to function as a test controller. The automation framework is initiated for the host computers by providing the test controller with a test initializer that initializes multiple hosts and a script parser that identifies script instructions for execution by multiple hosts. The automation framework provides each of the multiple hosts with its own script execution engine to execute script instructions, its own form of a logger to log the results of executing the script instructions, and its own communication component that synchronizes application testing between the multiple host computers. The automation framework enables synchronized application testing among multiple host computers with comparisons of instruction by instruction execution results in each of the host computers, thereby providing the necessary test coverage for applications that execute in a multi-node environment, such as many client-server applications FIG. 2 illustrates a block diagram of a system that implements an automation framework for a multi-node environment, under an embodiment. The automation framework for a multi-node environment may be portable, such that it can test applications in many different environments. The automation framework for a multi-node environment is scalable, such that the automation framework may test a multi-node application on anywhere from two host computers to thousands of host computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a first host 202, a second host 204, and a third host 206 that are provided by a hosting company. Although FIG. 2 depicts the system 200 with three hosts 202-206, the system 200 may include any number of hosts 202-206. Each of the hosts 202-206 is substantially similar to the system 100 depicted in FIG. 1. Since a system user selects the first host 202 to function as the application test controller, the first host 202 includes a text initialization component 208, a parser 210, a first execution engine 212, a first communication component 214, and a first logger 216.

The text initialization component 208 initializes the first host 202, the second host computer 204, and the third host 206 for testing an application. A user of the system 200 may initiate the automation framework for a multi-node environment via a command line interface, which is a text-only interface. A command line interface may be used whenever a large vocabulary of commands or queries, coupled with a wide range of options, can be entered more rapidly as text than can be entered with a pure graphic user interface (GUI).

Initializing the hosts 202-206 may include configuration initialization, communication initialization, and structure initialization. Configuration initialization may include performing pre-checks on configurations supported by the hosts 202-206 and initializing the different pre-set values to make the hosts 202-206 execution ready. Communication initialization may include checking that communication components, execution engines, and loggers are accessible on the other hosts 204 and 206. Communication initialization may also include checking for listeners on the other hosts 204 and 206, checking the ports used for communication by the other hosts 204 and 206, and establishing the local and remote connections between the hosts 202-206. Structure initialization may include checking for prerequisites on the other hosts 204 and 206, and ensuring that required services for testing are running on the other hosts 204 and 206. A system user may add additional checks to the configuration file for the test initialization component 208.

The test initialization component 208 may also determine if the hosts 202-206 are compatible for testing the application, and may terminate testing of the application if at least one of the hosts 202-206 is not compatible for testing the application. After the test initialization component 208 initializes the hosts 202-206, the parser 210 parses a test case suite 218 to identify multiple script instructions to test the application.

The first execution engine 212 determines whether to locally or remotely execute a script instruction that was identified by the parser 210. The first execution engine 212 may use data from the first data generator 220 to execute the first script instruction whenever the first execution engine 212 has determined that it is appropriate to locally execute the first script instruction. A local execution engine may locally execute a script instruction initially on the local host computer, which functions as the application test controller, before the remote execution engines remotely execute the script instruction on the remote host computers. The first logger 216 logs the result of the first host 202 executing a script instruction.

The first communication component 214 conveys an execution request from the first execution engine 212 to the other hosts 204 and 206 whenever the first execution engine 212 determines that it is appropriate to remotely execute a script instruction, such as when the first execution engine 212 has completed local execution of the script instruction. The first communication component 214 may also check for multiple prerequisites on the other hosts 204 and 206. Checking for multiple prerequisites may include verifying that a listener is active for ports for communication components on the other hosts 204 and 206 to communicate. Checking for multiple prerequisites may include resolving an internet protocol address for the other hosts 204 and 206. Checking for multiple prerequisites may also include verifying that any required firewall exceptions are added to enable communication between the first communication component 214 and the communication components on the other hosts 204 and 206.

Although the hosts 204 and 206 do not include a text initialization component or a parser, the second host 204 and the third host 206 share some similarities with the first host 202. For example, the second host 204 includes a second execution engine 222, a second communication component 224, and a second logger 226, while the third host 206 includes a third execution engine 230, a third communication component 232, and a third logger 234. The execution engines 222 and 230, the communication components 224 and 232, and the loggers 226 and 234 are substantially similar to the first execution engine 212, the first communication component 214, and the first logger 216, respectively. The first host 202 includes the text initialization component 208 and the parser 210 because the first host 202 is selected to function as the test controller for testing the application on the hosts 202-206, but any of the hosts 202-206 may include a text initialization component and a parser, if the host is selected to function as the test controller. A system user may select the host computer in which a system user needs the maximum control, such as the host computer that locally executes the largest number of operations, to function as the test controller.

The second communication component 224 and the third communication component 232 receive the execution request from the first communication component 214 whenever the test controller determines that it is appropriate to remotely execute a script instruction. Receipt of the execution request is enabled for the second communication component 224 and the third communication component 232 because these communication component 224 and 232 have initially established a connection with the first host 202, which functions as the test controller, via the first communication component 214. Upon receiving the execution request, the second communication component 224 and the third communication component 232 instruct the second execution engine 222 and the third execution engine 230 to execute a script instruction.

The second execution engine 222 may use data from the second data generator 228 to execute a script instruction and the third execution engine 230 may use data from the third data generator 236 to execute a script instruction. The data generators 220, 228, and 236 may be a file system data generator, a SQL data generator, an exchange data generator, a Sharepoint data generator, and/or an Oracle data generator. The second host 204 may execute a script instruction in parallel with the third host 206 executing the same script instruction. The hosts 204 and 206 may execute a script instruction as a remote shell command. The second logger 226 logs the result of the second host 204 executing a script instruction and the third logger 234 logs the result of the third host 206 executing a script instruction. The loggers 226 and 234 may send the results to a user-configured repository.

The second communication component 224 and the third communication component 232 may communicate an execution completion notice to the first communication component 214 after the hosts 204 and 206 execute a script instruction. The receipt of the execution completion notice by the first host 202 returns control of the application testing to the first host 202. The first host 202 may account for the detection of any failures by the execution of the script instructions on the hosts 204 and 206. If the execution of a particular script instruction failed in either of the hosts 204 and 206, the batch execution of the application testing does not stop because the first host 202 may continue the processing of the next script instruction in the test case suite 218. When the communication components 214, 224, and 232 communicate execution requests and execution completion notices, the system 200 synchronizes sequential execution of the script instructions.

Figure 3:
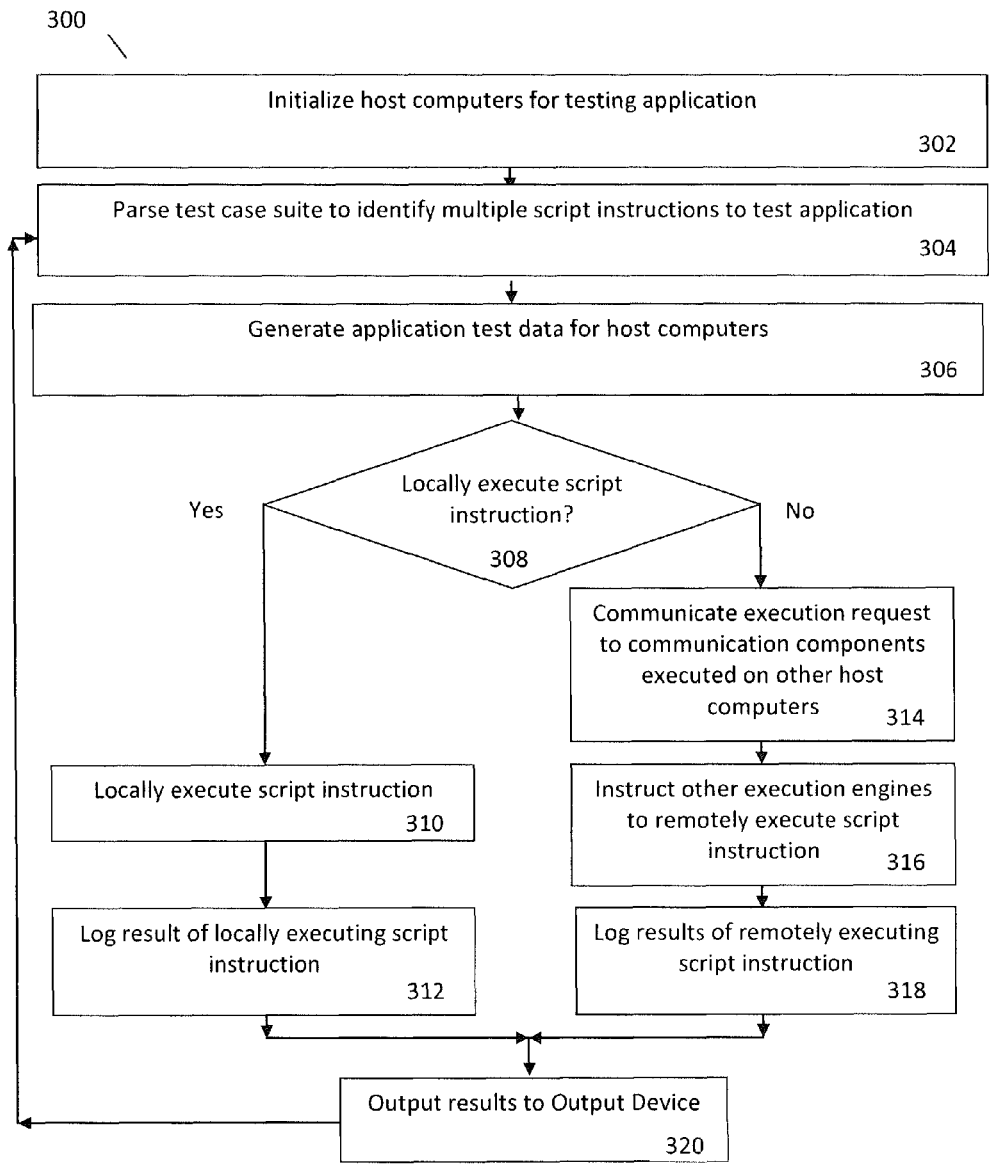
FIG. 3 is a flowchart that illustrates a method of an automation framework testing an application in a multi-node environment, under an embodiment.

The loggers 226 and 234 may be referred to as log collectors instead of loggers to differentiate the more limited capabilities of the loggers 226 and 234 relative to the more expansive capabilities of the first logger 216 operating in the host selected as the test controller. The first logger 216 outputs results to the output device 238. The first logger 216 may retrieve the results from the second host 204 and the third host 206 executing a script instruction, which may be stored in a user-configured repository. The first logger 216 may also function as a user-configured repository for the results from the second host 204 and the third host 206 executing the script instruction. The first logger 216 may also prepare a report based on any results and/or output a notification based on any results. The reports and notifications enable precise identification of which host failed to execute the application properly, which script instruction identified the failure, and when the failure occurred within the sequence of script instructions FIG. 3 is a flowchart that illustrates a method of an automation framework testing an application in a multi-node environment. Flowchart 300 illustrates method acts illustrated as flowchart blocks for certain steps involved in and between the hosts 202-206 of FIG. 2.

Host computers are initialized for testing an application, act 302. For example, the test initialization component 208 initializes the hosts 202-206 for testing an application designed for a multi-node environment.

A test case is parsed to identify multiple script instructions to test the application, act 306. For example, the parser 210 parses the test case suite 218 to identify script instructions to test the application.

Application test data is generated for host computers, act 304. For example, the data generators 220, 228, and 236 generate test data for the hosts 202, 204, and 206, respectively.

Whether to locally execute a script instruction is determined in act 308. Decision block 308 serves to determine when a script instruction is executed locally on the first host 202 and when the script instruction is executed remotely on the hosts 204 and 206.

A script instruction is locally executed, act 310. For example, when the first execution engine 212 determines that a script instruction is to be locally executed, the first execution engine 212 executes the script instruction locally on the first host 202.

A result is logged of locally executing the script instruction, act 312. For example, the first logger 216 logs the results of the first execution engine 212 locally executing the script instruction on the first host 202. Following act 312, the method 300 proceeds to act 320.

An execution request is communicated to communication components on other host computers, act 314. For example, if the first execution engine 212 determines that it has already executed a script instruction locally on the first host 202, the first execution engine 212 prompts the first communication component 214 to send an execution request for the script instruction to the second communication component 224 on the second host 204 and the third communication component 232 on the third host 206.

Other execution engines are instructed to remotely execute the script instruction, act 316. For example, the second communication component 224 instructs the second execution engine 222 to remotely execute the script instruction on the second host 204, and the third communication component 232 instructs the third execution engine 230 to remotely execute the script instruction on the third host 206.

Results are logged of remotely executing the script instruction, act 318. For example, the second logger 226 logs the results of the second execution engine 222 remotely executing the script instruction on the second host 204, and the third logger 234 logs the results of the third execution engine 230 remotely executing the script instruction on the third host 206.

Results are output to an output device, act 320. For example, the first logger 216 outputs results from the first execution engine 212 executing the script instruction locally on the first host 202, the second execution engine 222 executing the script instruction locally on the second host 204, and the third execution engine 230 executing the script instruction locally on the third host 206. The system 200 depicted in FIG. 2 may execute the acts 304-320 until all of the script instructions identified in the test case suite 218 depicted in FIG. 2 are executed to test the application. Although FIG. 3 depicts the acts 302-320 occurring in a specific order, the acts 302-320 may occur in another order.

The automation framework described herein offers more test coverage than prior art application frameworks, simulating a real time multi-node environment for applications that are executed in a multi-node environment by testing applications on a multi-node environment with multiple host computers. The automation framework provides a test controller host computer with a multi-node test initialization component, and provides each of the multiple host computers with its own communication component that synchronizes application testing among multiple host computers. The automation framework enables comparisons of instruction by instruction execution results in each of the host computers, thereby providing the necessary test coverage for applications that execute in a multi-node environment, such as many client-server applications The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to.

The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for an automation framework for a multi-node environment, the system comprising:
a parser executed on a first host computer to parse a test case suite to identify multiple script instructions to be subsequently executed to test an application;
a first execution engine executed on the first host computer to determine whether to locally execute a first script instruction of the multiple script instructions, and further configured to execute the first script instruction in response to a determination to locally execute the first script instruction;
a first communication component executed on the first host computer to communicate an execution request to a second communication component executed on a second host computer in response to a determination to not locally execute the first script instruction, wherein the second communication component instructs a second execution engine executed on the second host computer to execute the first script instruction in response to receiving the execution request;
a first logger executed on the first host computer to log a first result of executing the first script instruction on the first host computer; and
a second logger executed on the second host computer to log a second result of executing the first script instruction on the second host computer, wherein the first logger is further configured to output at least one of the first result and the second result via an output device.

2. The system of claim 1, wherein the first communication component further checks for multiple prerequisites on the second host computer.

3. The system of claim 1, wherein checking for multiple prerequisites comprises verifying that a listener is active for a port for the second communication component to communicate.

4. The system of claim 3, wherein checking for multiple prerequisites comprises resolving an internet protocol address for the second host computer.

5. The system of claim 3, wherein checking for multiple prerequisites comprises verifying that at least one firewall exception is added to enable communication between the first communication component and the second communication component.

6. The system of claim 1, wherein the first logger is further retrieves the second result and prepare a report based on at least one of the first result and the second result.

7. The system of claim 1, wherein the first logger is further updates a user-configured repository for the second result and outputs a notification based on at least one of the first result and the second result.

8. The system of claim 1 further comprising a test initialization component executed on the first host computer to initialize the first host computer and the second host computer for testing the application.

9. The system of claim 8, wherein the test initialization component is initiated via a command line interface.

10. The system of claim 8 wherein the test initialization component is further determines if at least one of the first host computer and the second host computer is compatible for testing the application, and terminates testing of the application in response to a determination that at least one of the first host computer and the second host computer is not compatible for testing the application.

11. The system of claim 8 wherein initializing the first host computer and the second host computer comprises configuration initialization, communication initialization, and structure initialization.

12. The system of claim 11 wherein the communication initialization comprises checking that the second communication component, the second execution engine, and the second logger are accessible on the second host computer.

13. The system of claim 11 wherein the structure initialization comprises checking for prerequisites on the second host computer and ensuring that required services for testing are running on the second host computer.

14. The system of claim 1 further comprising a first data generator that generates application test data for the first host computer and a second data generator that generates application test data for the second host computer.

15. The system of claim 1 wherein at least one of the first data generator and the second data generator is one of a file system data generator, a SQL data generator, an exchange data generator, a Sharepoint data generator, and an Oracle data generator.

16. A computer-implemented method for an automation framework for a multi-node environment, the method comprising:
parsing a test case suite to identify multiple script instructions to be subsequently executed to test an application;
determining whether to locally execute a first script instruction of the multiple script instructions;
executing the first script instruction on a first host computer in response to a determination to locally execute the first script instruction;
communicating an execution request to a second host computer and a third host computer in response to a determination to not locally execute the first script instruction;
executing the first script instruction on the second host computer in response to receiving the execution request;
executing the first script instruction on the third host computer in response to receiving the execution request;
logging a first result of executing the first script instruction on the first host computer;
logging a second result of executing the first script instruction on the second host computer;
logging a third result of executing the first script instruction on the third host computer; and
outputting at least one of the first result, the second result, and the third result via an output device.

17. The method of claim 16 wherein the first script instruction is executed on the second host computer in parallel with executing the first script instruction on the third host computer.

18. The method of claim 16 wherein at least one of executing the first script instruction on the second host computer and executing the first script instruction on the third host computer is executed as a remote shell command.

19. The method of claim 16 further comprising communicating an execution completion notice to the first host computer in response to at least one of executing the first script instruction on the second host computer and executing the first script instruction on the third host computer.

20. A computer program product, comprising a non-transitory computer-readable medium having a computer-readable program code embodied therein, the computer-readable program code adapted to be executed by one or more processors the program code including instructions to:
parse a test case suite to identify multiple script instructions to be subsequently executed to test an application;
determine whether to locally execute a first script instruction of the multiple script instructions;
execute the first script instruction on a first host computer in response to a determination to locally execute the first script instruction;
communicate an execution request to a second host computer in response to a determination to not locally execute the first script instruction;
execute the first script instruction on the second host computer in response to receiving the execution request;
log a first result of executing the first script instruction on the first host computer;
log a second result of executing the first script instruction on the second host computer communicate an execution completion notice to the first host computer in response to executing the first script instruction on the second host computer;
determine whether to locally execute a second script instruction of the multiple script instructions in response to receiving the execution completion notice;
execute the second script instruction on a first host computer in response to a determination to locally execute the second script instruction;
communicate an execution request to a second host computer in response to a determination to not locally execute the second script instruction;
execute the second script instruction on the second host computer in response to receiving the execution request;
log a third result of executing the second script instruction on the first host computer;
log a fourth result of executing the second script instruction on the second host computer output at least one of the first result, the second result, the third result, and the fourth result via an output device.

* * * * *